Aug. 16, 1949.  LA VERN A. CAMPBELL  2,479,036
CAB STRUCTURE

Filed June 23, 1947  3 Sheets-Sheet 1

Inventor
LA VERN A. CAMPBELL

Attorneys

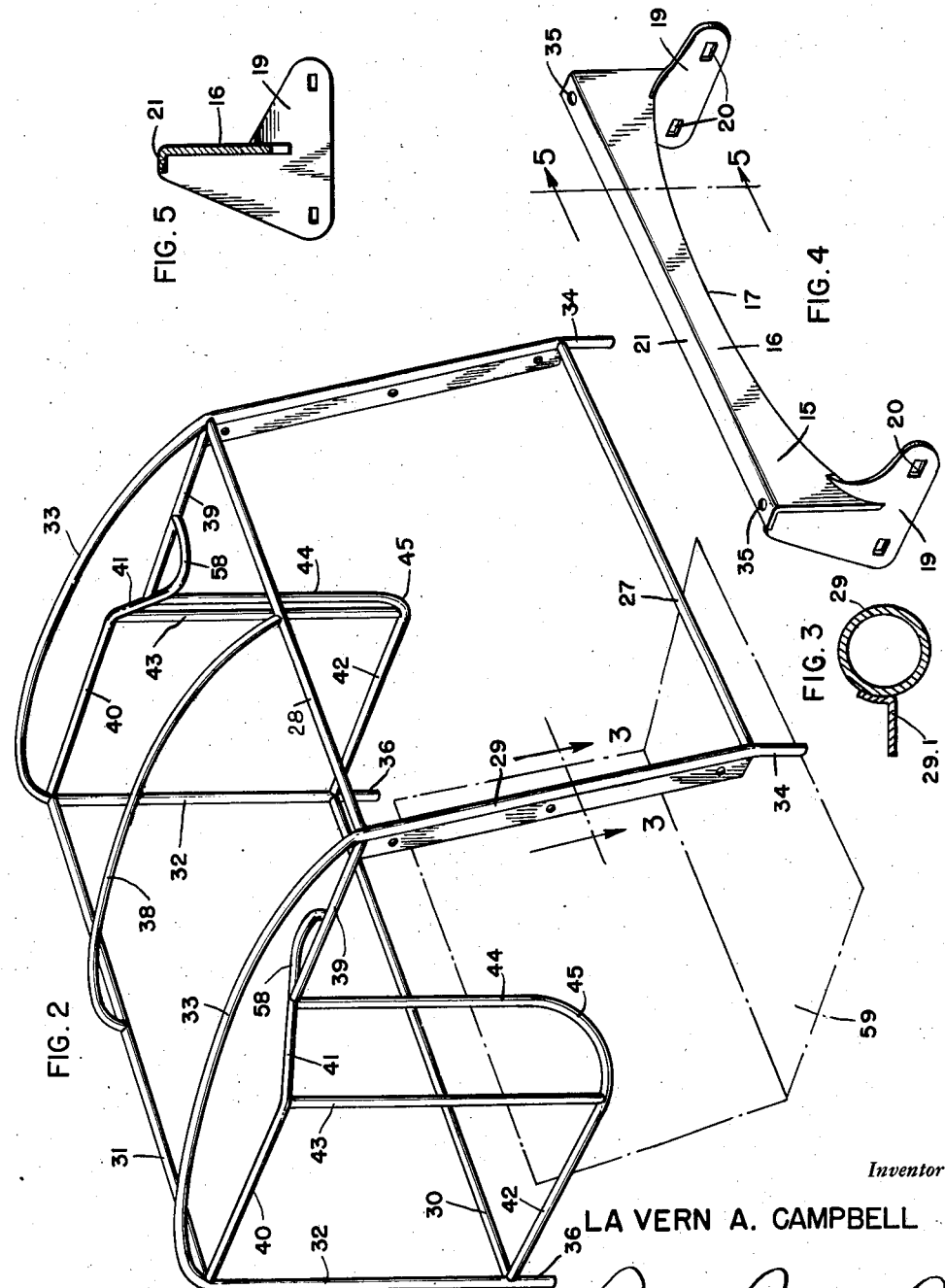

Aug. 16, 1949.    LA VERN A. CAMPBELL    2,479,036
CAB STRUCTURE
Filed June 23, 1947    3 Sheets-Sheet 3
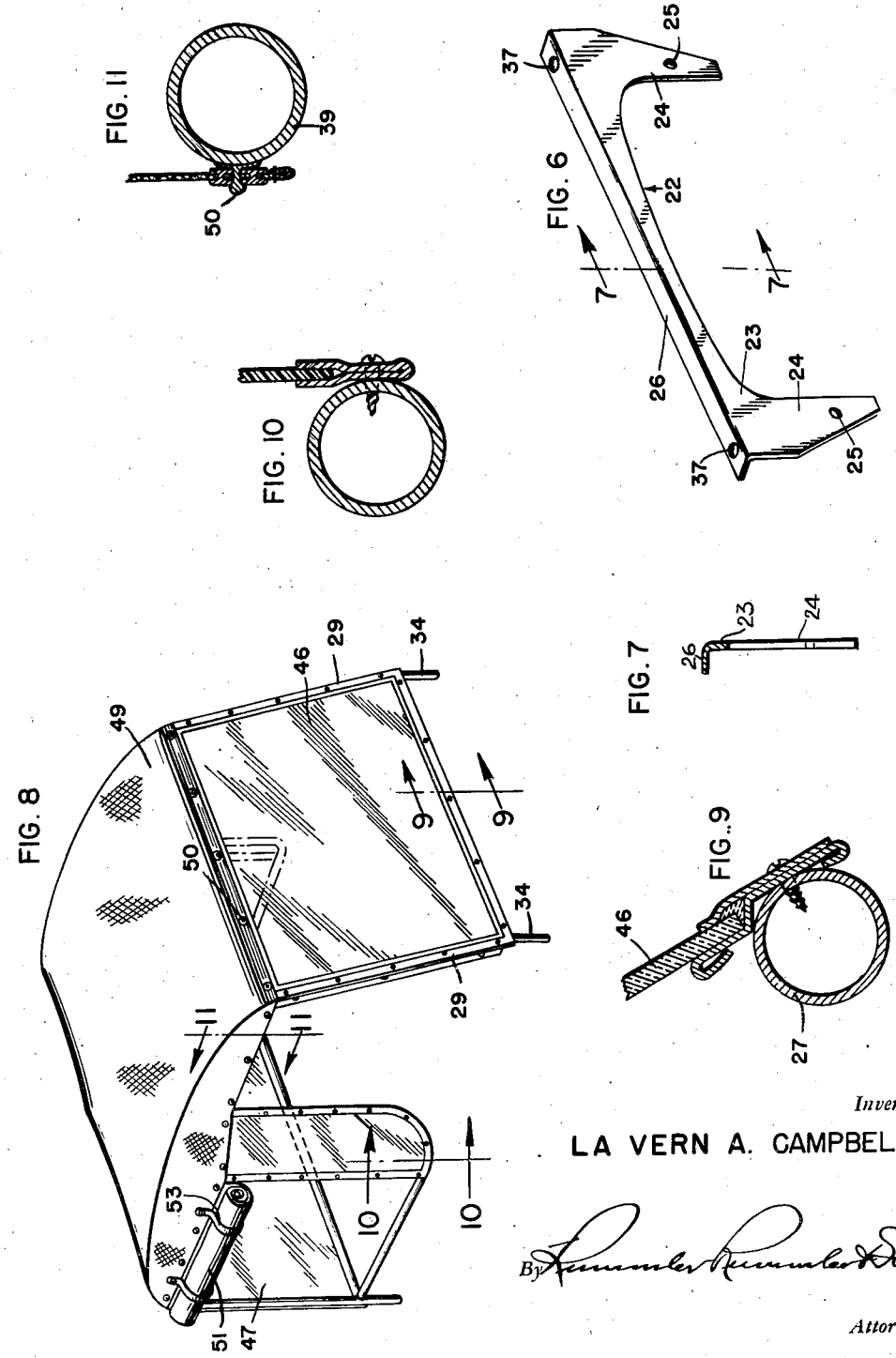
Inventor
LA VERN A. CAMPBELL
Attorneys Patented Aug. 16, 1949

2,479,036

UNITED STATES PATENT OFFICE 2,479,036

CAB STRUCTURE

La Vern A. Campbell, Grayslake, Ill.

Application June 23, 1947, Serial No. 756,418

4 Claims. (Cl. 296—102)

This invention relates to vehicle cab structures and particularly to such as are adapted to be supplied as accessory equipment for tractors and other vehicles that do not have a cab as an integral part of their frame structure.

In many forms of tractors, particularly such as are employed for operating road building machines, materials-handling machines and mechanically driven ground-working equipment, the vehicle frame structure, the necessity of having quick access to mechanism, and the space available for the operator's seat have been such as to lead to the general construction of such vehicles without having cabs to protect the operator from wind and rain and other weather conditions. This invention is particularly directed to providing a cab structure that is readily adaptable for use on such vehicles with a minimum of parts requiring modification to suit individually different types of vehicles, and with adequate provision for attaching it and removing it quickly from its place on the vehicle chassis.

The main objects of this invention are to provide an improved form of cab structure suitable for attachment to vehicles of various types regardless of the form of the vehicle chassis structure; to provide a structure of this kind provided with self-adjusting means for protecting it from strains due to the relative movement of the vehicle frame; to provide an improved form of cab structure that offers a minimum of interference to the range of vision of the operator in any horizontal direction and that affords a wide vertical angular range of vision from the roadway adjacent the sides of the vehicle to a considerable height above the vehicle; to provide a structure of this kind which is readily attachable and detachable to and from the vehicle frame and which is very light in weight and particularly arranged to be easily handled by a single operator during such placement on and removal from the vehicle; to provide an improved form of cab layout that makes adequate provision for the comfort of the occupant even in cases where particular vehicle design might prohibit the use of previously existing forms of cab structures; and to provide a cab structure having a wide horizontal angular range of vision for the occupant even in cases where the space available for a front windshield is limited by movement of implements-carrying booms and other devices at the sides of the operator's seat.

A specific embodiment of this invention is illustrated in the accompanying drawings, which:

Fig. 2 is a corresponding perspective view showing the skeleton frame structure with the surrounding wall material removed. The operator's seat is shown in outline by broken lines to indicate its relation to the cab frame.

Fig. 3 is a sectional detail taken on the line 3—3 of Fig. 2.

Fig. 4 is a perspective view of the sill or saddle structure upon which the front end of the cab is connected to the vehicle.

Fig. 5 is a section taken on the line 5—5 of Fig. 4.

Fig. 6 is an perspective view illustrating a form of saddle structure suitable for supporting and connecting the rear end of the cab to the vehicle structure.

Fig. 7 is a section on the line 7—7 of Fig. 6.

Fig. 8 is a perspective view corresponding to Fig. 1 but with the rearward side wall curtain rolled up and the front side wall curtain removed to provide freedom of air movement crosswise through the cab.

Fig. 9 is a sectional detail taken on the line 9—9 of Fig. 8, showing a suitable frame structure for the glass panels.

Fig. 10 is a sectional detail on the line 10—10 of Fig. 8.

Fig. 11 is a sectional detail taken on the line 11—11 of Fig. 8.

The improved cab comprises generally a pair of sills or saddles spaced apart in parallel relation to each other and permanently mounted on the vehicle, a skeleton cab frame bridging and demountably carried on these sills, and an envelope supported by the skeleton frame and comprising a roof and vertical walls made up largely of windows and curtains. In plan the cab is provided with side bays adjacent the operator's seat into which he can lean to see out along the sides of the vehicle with almost as much freedom as if no cab were present. Lightness and demountability are important factors of novelty and utility of the present invention.

Figure 1:
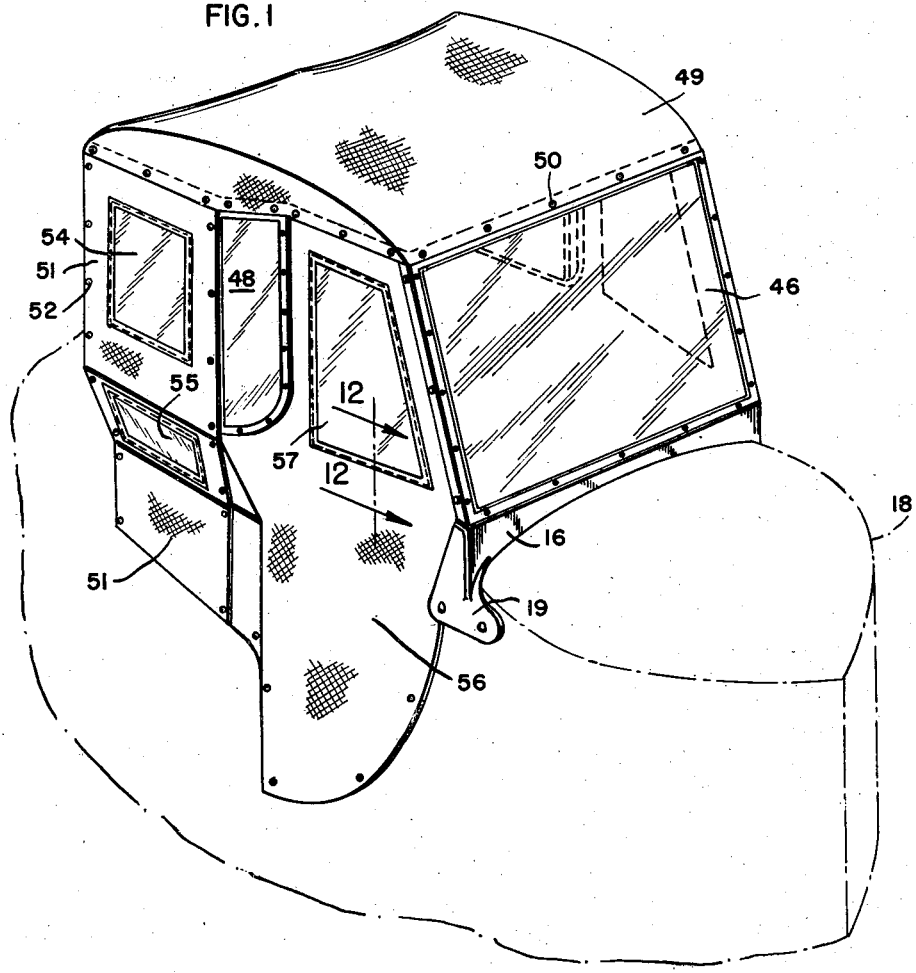
Figure 1 is a perspective view showing the external appearance of the cab in its relation to adjacent portions of the vehicle on which it is mounted, the latter being indicated by broken lines.

In the form shown, the front sill or saddle 15 comprising a vertically disposed web member 16 whose lower edge 17 is shaped to conform to the contour of some local part of the vehicle such as the hood 18, indicated in Figure 1. The saddle 15 also comprises side plates 19 whereby it may be firmly attached to the vehicle as by means of bolts passing through appropriately placed apertures 20. The saddle 15 has a flange 21 on its upper edge to form a ledge for supporting the cab frame.

A rear saddle 22 extends across the vehicle frame back of the driver's seat on the vehicle and is somewhat similar in construction to the front saddle in that it has an upright web 23 formed and arranged for attachment to the local frame structure of some specific type of vehicle. As shown in Fig. 6, the web 23 has depending arms 24 apertured at 25 for bolts connecting it to the vehicle. This saddle also has a straight top ledge 26 which may be a flange on the web 23 for supporting the rear end of the cab frame.

The cab frame is a skeleton structure preferably made up for the most part of light metal tubing, assembled preferably by welding to form a rectangular front panel frame comprising horizontal bottom and top members 27 and 28 and upright side members 29. The cab frame comprises a rear panel frame made up of vertically spaced bottom and top bars 30 and 31 and vertical bars 32. The side members 29 and 32 preferably comprise the legs of U-shaped units with arched top members 33. The bars 29 extend downwardly beyond the lower frame bar 27 to form the front posts or stanchions 34 which are positioned to engage upwardly opening socket apertures 35 in the ledge 21 of the saddle 15. Similarly, the upright bars 32 are extended downwardly below the bar 30 to form stanchions 36 positioned to engage the sockets 37 in the rear saddle when the bar 30 rests on ledge 26 of that saddle. One or more intermediate top frame members 38, arched to correspond with the curvature of the frame members 33, extend from the bar 28 to the bar 31 and cooperate with the bars 33 in the support of the roof portion of the cab envelope.

As will be seen particularly from Fig. 2, the rear panel, formed by the frame bars 30, 31 and 32, is considerably wider than the front panel, formed by the side bars 27, 28 and 29, and these panels are symmetrically arranged with respect to each other so that the rear panel extends a considerable distance laterally outward beyond the sides of the front panel.

Each bar 29 is connected by a cross member to its respective bar 32 at about the level of the bars 28 and 31, and such cross member comprises bars 39 and 40 which are substantially parallel with each other and connected by an angularly offset bar 41. A bottom bar 42 is connected to the upright bar 32 and to a second upright bar 43 depending from the bar 40 so as to define a rearward side panel at each side of the cab frame. A forwardly and inwardly inclined wing wall panel frame is formed by the bars 43 and 41 and an additional bar 44 which parallels the bar 43 throughout the greater part of its height but is curved rearwardly and outwardly at its lower portion 45 to meet the bar 42. The bars 41, 43 and 44 define this forwardly and inwardly inclined wing panel which is rectangular in form, except that its lower front corner is rounded off, as indicated at 45.

The front panel of the frame structure supports a windshield 46 of appropriate construction, preferably of heavy shatterproof glass, which extends throughout substantially the entire area of the panel defined by the bars 27, 28 and 29 of the frame structure.

A similar rear view window 47 extends over substantially the entire area of the rear panel defined by the bars 30, 31 and 32 of the cab frame. Windows 48 are mounted in the wing panel frames formed by the bars 41, 43, 44 and 45. Each of these windows is provided with an appropriate frame whereby it is permanently attached to the cab frame bars.

The roof 49 of the cab may be of any desired material but for lightness is preferably formed of flexible material such as canvas, appropriately shaped to overlay the roof bars 33, 38, 33 of the cab frame, and is attached at its margins to the frame bars 28, 31, 39, 41 and 40, preferably by snap and fasteners 50, as indicated in Fig. 8 and shown in detail in Fig. 11.

The open side panels 47 are closed by curtain-like side walls 51 connected by snap button fasteners 52 to the bars of the panel 47 in such manner that they can be readily rolled up and fastened by straps 53 as is indicated in Fig. 8.

The curtains 51 are provided with upper and lower windows 54 and 55, which consist of flexible transparent panels stitched to the curtain material and which are capable of being flexed therewith.

Figure 12:
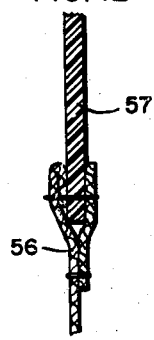
Fig. 12 is a sectional detail taken on the line 12—12 of Fig. 1.

A pair of door curtains 56 appropriately formed and provided with snap fasteners for attachment to the bars 39, 44, 29 and to adjacent parts of the vehicle body complete the envelope structure that surrounds the cab frame. These door curtains, like the rearward sidewall curtains, are of flexible material and are provided with flexible window panels 57 spanning openings in the curtain structure and marginally stitched to the margins of those openings, as indicated in Fig. 12.

The stanchions 34 and 36 have a snug fit with the apertures 35 and 37 in the saddles but are otherwise unfastened and the cab is held in place mainly by its weight, in addition to these connections, so that it is free from strains that might arise from tortional yielding of the vehicle frame under the heavy strains which such vehicles have to withstand. When the side curtains are in place and fastened to the vehicle frame they contribute to the holding of the cab in place, when subject to strong wind pressures.

These cabs are usually designed to accommodate only the operator of the vehicle and are accordingly of such light weight that they can be readily handled by a single man.

In order to facilitate the lifting of the cab for purposes of placement on and removal from the vehicle, the frame is provided with handles 58, preferably formed by extending the bars 41 inwardly beyond the points of their juncture with the bars 39 and 44 and then bending them back and welding their ends to the bars 39.

At this location, due to the fact that the windshield is usually much heavier than other window panes, the handles 58 are in such position that when grasped by the hands of the operator, they will balance the weight of the cab sufficiently to enable the operator to simultaneously lift all four stanchions 34 and 36 from their sockets through an upward thrust on the handles 58, after the side curtains have been released from their connections with the vehicle frame through the snap fasteners, as indicated.

The bays formed at each side of the operator's seat, due to the offsets in the side walls of the cab, enable him to lean sidewise so as to get an unobstructed forward view along either side of the vehicle to observe the roadway and the operation of equipment with almost as much freedom from obstruction to vision as if no cab were present. Inasmuch as the bays at the side of the cab extend considerably outward beyond the sides of the operator's seat, the side wall curtain 51, when in position, is swung inward and attached to the sides of the seat or an adjacent structure so that the window 55 is inclined downwardly and inwardly as shown in Figure 1, thus giving the operator a downward view at the sides of his seat which is of great advantage, especially when the cab is mounted on a wheeled tractor. This enables the operator to obtain a view of the road surface adjacent the rear wheels of the tractor and is an added advantage that accrues from the bays at the sides of the cab.

Although but on specific embodiment of this invention is herein shown and described, it will be understood that numerous details of the construction shown may be altered or omitted without departing from the spirit of the invention as defined by the following claims.

I claim:

1. A cab structure for vehicles, comprising a pair of saddles adapted for attachment in transverse positions on a vehicle frame in locations respectively in front of and behind the operator's seat, each of said saddles having an upwardly open socket at each side of the vehicle, a skeleton frame defining the form of the cab and resting on said saddles, depending vertical stanchions fixed on said skeleton frame and positioned to engage said saddle sockets respectively, and a pair of handles on opposite sides of said skeleton frame and symmetrically located in spaced relation to each other at a predetermined location lengthwise of the cab so as to balance the weight of the cab, whereby a single operator may grasp said handles and simultaneously lift all said stanchions simultaneously from said saddle sockets.

2. A cab structure, comprising a skeleton frame defining a front wall frame of approximately rectangular outline, a rear wall frame of greater width than said front wall frame, a pair of rearward sidewall frames spaced from said front wall frame to provide doorways between said rearward sidewall frames and said front wall frame, inwardly and forwardly directed wing wall frames forming extensions of said rearward sidewall frames, a transparent windshield forming a window extending across said front wall frame, and transparent window panes in said wing wall frames positioned to increase the forwardly directed range of view adjacent to and beyond the lateral scope of that of the windshield.

3. A vehicle cab, comprising means providing upwardly open attachment sockets generally defining the boundaries of a cab area on a vehicle frame, a cab frame of skeleton structure comprising vertically disposed stanchions positioned to engage said sockets and horizontal frame bars rigidly connecting said stanchions, and a pair of handles affixed to and extending inwardly from said horizontal frame bars and at respectively opposite sides of said cab frame, said handles being positioned at a predetermined location lengthwise of the cab frame so as to support said cab frame in approximate balance when said cab frame is lifted by said handles to withdraw all said stanchions simultaneously from said sockets.

4. In combination a vehicle frame, an operator's seat mounted thereon and a cab structure surrounding said seat, said cab structure comprising a front windshield window, side walls having outwardly extending bays at each side of said seat with front wing windows located laterally outward beyond the sides of said windshield window and spaced rearward of said windshield window to provide a doorway between said windshield and wing windows.

LA VERN A. CAMPBELL.

REFERENCES CITED

The following references are of record in the file of this patent:

UNITED STATES PATENTS

| Number | Name | Date |
| --- | --- | --- |
| 1,334,312 | Motts et al. | Mar. 23, 1920 |
| 1,538,384 | Crockett et al. | May 19, 1925 |
| 1,944,429 | Hartry | Jan. 23, 1934 |
| 2,256,890 | Brown et al. | Sept. 23, 1941 |
| 2,423,748 | Acheson | July 8, 1947 |

FOREIGN PATENTS

| Number | Country | Date |
| --- | --- | --- |
| 467,962 | Great Britain | June 25, 1937 |